US008186341B2

United States Patent
Lata Perez

(10) Patent No.: US 8,186,341 B2
(45) Date of Patent: May 29, 2012

(54) THIN WALL HEADER WITH A VARIABLE CROSS-SECTION FOR SOLAR ABSORPTION PANELS

(75) Inventor: Jesus Maria Lata Perez, Guecho (ES)

(73) Assignee: Sener, Ingenieria y Sistemas, S.A. (ES)

( * ) Notice: Subject to any disclaimer, the term of this patent is extended or adjusted under 35 U.S.C. 154(b) by 468 days.

(21) Appl. No.: 12/162,508

(22) PCT Filed: Jan. 31, 2007

(86) PCT No.: PCT/EP2007/000806
§ 371 (c)(1),
(2), (4) Date: Dec. 16, 2008

(87) PCT Pub. No.: WO2007/088031
PCT Pub. Date: Aug. 9, 2007

(65) Prior Publication Data
US 2009/0250051 A1    Oct. 8, 2009

(30) Foreign Application Priority Data
Feb. 1, 2006   (ES) .................................. 200600221

(51) Int. Cl.
*F24J 2/24* (2006.01)
(52) U.S. Cl. ........ 126/663; 126/651; 165/172; 165/173; 165/175; 165/DIG. 489
(58) Field of Classification Search ................. 126/663, 126/651; 165/172, 173, 175, DIG. 489
See application file for complete search history.

(56) References Cited

U.S. PATENT DOCUMENTS

| | | | | |
|---|---|---|---|---|
| 1,813,117 A * | 7/1931 | Darlington | ...................... | 196/98 |
| 1,884,481 A * | 10/1932 | Woynarowski | ............... | 122/360 |
| 1,943,855 A * | 1/1934 | Carter | ........................... | 165/115 |
| 2,439,208 A * | 4/1948 | Gloyer | ........................... | 165/140 |
| 2,592,950 A * | 4/1952 | Przyborowski | ............... | 165/153 |

(Continued)

FOREIGN PATENT DOCUMENTS
DE        21 60 372        6/1973
(Continued)

OTHER PUBLICATIONS

Kern. "New Design of brazed all-aluminum-radiators for vehicles." *ATZ Automobile Technical Magazine*. vol. 100. 1998. pp. 670-673.

(Continued)

*Primary Examiner* — Kenneth Rinehart
*Assistant Examiner* — Jorge Pereiro
(74) *Attorney, Agent, or Firm* — Ostrolenk Faber LLP

(57) ABSTRACT

The invention relates to a thin wall header with a variable cross-section for solar absorption panels, manufactured in nickel-based superalloy and formed by a main thin wall body (18) and by a plurality of nozzles (16,21).
The header (10) is connected to a series of junction nozzles (16) wherein respective solar absorption tubes (14) are connected, and at least one inlet or outlet nozzle (21) wherein at least a fed tube is connected. The body (18) can have a spindle shape or can be formed by two frustoconical sections joined by the larger base, and can further have a central cylindrical section at the height of the inlet or outlet nozzles (21).
It is applicable in the collection of fluids at high temperature, especially in solar panels.

7 Claims, 3 Drawing Sheets

U.S. PATENT DOCUMENTS

| | | | |
|---|---|---|---|
| 2,934,322 A | | 4/1960 | Hazard |
| 3,372,738 A | * | 3/1968 | Jan et al. ............................ 165/47 |
| 3,640,843 A | * | 2/1972 | Means ........................... 162/343 |
| 4,093,024 A | | 6/1978 | Middleton ..................... 165/170 |
| 4,094,734 A | * | 6/1978 | Henderson ................... 159/13.2 |
| 4,098,329 A | * | 7/1978 | Culver ........................... 165/140 |
| 4,122,828 A | | 10/1978 | DiPeri |
| 4,161,809 A | * | 7/1979 | Severson ................. 29/890.033 |
| 4,178,910 A | * | 12/1979 | Gramer et al. ................ 126/677 |
| 4,237,866 A | * | 12/1980 | Rush ............................... 126/635 |
| 4,290,413 A | * | 9/1981 | Goodman et al. ............. 126/624 |
| 4,355,602 A | * | 10/1982 | Cooke ...................... 122/235.11 |
| 4,391,046 A | * | 7/1983 | Pietraschke ........................ 34/93 |
| 4,485,803 A | * | 12/1984 | Wiener ......................... 126/591 |
| 4,557,319 A | * | 12/1985 | Arnold ............................ 165/44 |
| 4,676,305 A | * | 6/1987 | Doty .............................. 165/158 |
| 4,923,679 A | * | 5/1990 | Fukasawa et al. .............. 422/48 |
| 4,928,755 A | * | 5/1990 | Doty et al. .................... 165/168 |
| 4,993,485 A | * | 2/1991 | Gorman ........................... 165/85 |
| 5,037,610 A | * | 8/1991 | Fukasawa et al. .............. 422/48 |
| 5,116,308 A | * | 5/1992 | Hagiwara .................... 604/6.15 |
| 5,188,911 A | * | 2/1993 | Downing et al. ............... 429/70 |
| 5,252,778 A | * | 10/1993 | Ogawa ......................... 174/16.1 |
| 5,267,605 A | * | 12/1993 | Doty et al. ...................... 165/41 |
| 5,268,727 A | * | 12/1993 | Thayer et al. ................. 399/102 |
| 5,850,831 A | | 12/1998 | Marko |
| 5,862,800 A | * | 1/1999 | Marko .......................... 126/680 |
| 6,038,768 A | * | 3/2000 | Rhodes .................... 29/890.043 |
| 6,057,000 A | * | 5/2000 | Cai ................................ 427/358 |
| 6,142,217 A | * | 11/2000 | Haussmann .................... 165/76 |
| 6,619,386 B2 | * | 9/2003 | Iino et al. ...................... 165/173 |
| 6,736,134 B2 | * | 5/2004 | Marko .......................... 126/680 |
| 6,895,826 B1 | * | 5/2005 | Nakao et al. ............. 73/861.355 |
| 6,957,536 B2 | * | 10/2005 | Litwin et al. ................. 60/641.8 |
| 2003/0041857 A1 | * | 3/2003 | Marko .......................... 126/680 |
| 2004/0108099 A1 | | 6/2004 | Litwin |
| 2008/0213141 A1 | * | 9/2008 | Pinchot ......................... 422/193 |

FOREIGN PATENT DOCUMENTS

| | | |
|---|---|---|
| DE | 36 09 186 | 9/1987 |
| DE | 37 32 081 | 4/1989 |
| EP | 0 453 763 | 10/1991 |
| EP | 1 148 231 | 10/2001 |
| FR | 2 355 266 | 1/1978 |
| WO | WO 03/021159 | 3/2003 |

OTHER PUBLICATIONS

European Office Action dated Dec. 8, 2010.
Chinese Office Action dated Nov. 13, 2009 with English translation.
Chinese Office Action dated Oct. 26, 2010 with English translation.
Mexican Office Action dated Apr. 28, 2011.
European Intention to Grant dated Jul. 5, 2011.

* cited by examiner

THIN WALL HEADER WITH A VARIABLE CROSS-SECTION FOR SOLAR ABSORPTION PANELS

This application is a National Stage Application of PCT/EP2007/000806, filed 31 Jan. 2007, which claims benefit of Ser. No. P200600221, filed 1 Feb. 2006 in Spain and which application(s) are incorporated herein by reference. A claim of priority to all, to the extent appropriate is made.

FIELD OF THE INVENTION

The present invention relates to the design of headers, and more specifically to the design of the headers used to distribute and collect the solar absorption tubes of a solar absorption panel belonging to a solar central receiver, typically of molten salts but which can use other high temperature transfer fluid.

STATE OF THE ART

Thin wall cylindrical headers with a constant cross-section to which solar absorption tubes are connected by means of machined bushings and nozzles that are subsequently welded to the cylindrical headers have been used before in molten salt receiver panels of solar absorption tubes. The nozzles have been sometimes directly extruded from the cylindrical header. These embodiments can be observed in US patent U.S. Pat. No. 6,736,134 B2 or in its PCT WO 03/021159 A2 version.

Some of the constructions of this type subject the junction areas for joining the body of the header with the solar absorption tubes to high thermal strains, especially in the side areas of the header, with a low salt flow. These thermal strains are caused by rapid temperature changes in the molten salts flowing through the header due to cloud passage over the heliostat field of the solar plant. These strains due to sudden temperature changes can be reduced by placing sleeves or other thermal protections in the junction nozzles for joining the solar absorption tubes to the header. However, these protections have geometries that are difficult to manufacture and difficult to assemble, which increases the manufacturing and inspection difficulty and makes these processes expensive. The useful life of the installation is extremely short without these protections.

On the other hand, this cylindrical header requires a minimal cross-sectional flow area for the purpose of uniformly distributing the flow of salts or transfer fluid through all the solar absorption tubes connected to the header, at a minimum pressure loss. However, it is well known that the flow of salts or transfer fluid is not uniform throughout the header and this variable flow distribution will depend on the configuration of connections on the header both of the tube or the tubes feeding it and of the configuration of the solar absorption tubes distributing the salts or transfer fluid.

In cylindrical headers with a constant cross-section and which are basically fed at its central part, the speeds of the transfer fluid are very much reduced in their side areas as the fluid is distributed through the solar absorption tubes connecting with the central part of the header, causing severe pre-transient thermal strains in the junction nozzles with the solar absorption tubes connecting with the side parts of the header.

This cylindrical header configuration with a constant cross-section does not optimize, in these parts far from the feed tubes for feeding the header, the combination of the thermal strains generated by cloud transients with the mechanical stresses which the header must absorb as a container under pressure, and this causes a need in its main body for wall thicknesses greater than those desired, which is also damaging for the derived thermal strains in the junction nozzles for joining the header to the solar absorption tubes.

Therefore, a main object of the present invention is to provide a header configuration that can be used in solar receiver panels, either of molten salts or of any other transfer fluid, which resists more effectively the thermal strains experienced in the junction nozzles for joining the header to the solar absorption tubes without needing to use complex and expensive thermal protection devices.

Another object of the present invention is to provide a header configuration for the use in solar receiver panels, either of molten salts or of any other transfer fluid, which allows using a thin wall in the main body of the header such that the junction nozzles for the joining to the solar absorption tubes are better matched to the thin thicknesses of those tubes.

Another object of the present invention is to provide a header configuration for the use in solar receiver panels, either of molten salts or of any other transfer fluid, which allows using the same concept of header—solar absorption tube junction nozzle for all the tubes connected thereto, both those located in the areas of the header with high flow of salts or transfer fluid and in those areas with low flow, with the subsequent advantages of manufacture and cost.

DESCRIPTION OF THE INVENTION

The previous and other objects are provided by a thin wall header which frequently has a small maximum diameter and a variable cross-section.

A material has to be selected from the possible materials that can be used to manufacture the header and the solar absorption tubes which has good properties at high temperatures, above 600° C., i.e., a high mechanical strength, a good thermal fatigue strength, a good creep strength, a good corrosion resistance under strain at high temperature against nitrate salts or against the transfer fluid used, a low coefficient of thermal expansion, such that the loads due to thermal deformations are reduced, it can be welded, it can be shaped and is commonly used. In this sense, nickel-based superalloys, such as Inconel 625 or the like, are good candidates.

The header assembly incorporates extruded or machined and later welded junction nozzles, all of them preferably manufactured in a nickel-based superalloy, for the distribution and collection of the molten salts, or the transfer fluid in question, through the solar absorption tubes. The header also incorporates at least one inlet or outlet nozzle connecting the body of the header to at least one feed tube. The body of the header will not be cylindrical with a constant cross-section, rather it will have a variable cross-section, maximum in the junction section for the joining to the tube or junction sections for the joining to the feed tubes and being reduced as the section of the header moves away from the feed tube or the tubes.

An important function of the header is to provide a uniform distribution of the flow of salts or transfer fluid to the solar absorption tubes, at minimum pressure losses. To that end, it is advantageous for the flow area of the tube feeding the header to be at least equal to the sum of the flow areas of the solar absorption tubes connected to the header. If instead of one feed tube for feeding the header, more than one is used, it is the sum of the flow areas of the feed tubes that must be at least equal to the sum of flow areas of the solar absorption tubes connected to the header.

The maximum cross-section of the body of the header, which will be located in the junction area for the joining to the tube feeding it, must be at least equal to 1.5 times the sum of the flow areas of the solar absorption tubes connected to the header. The remaining cross-sections of the body of the header will progressively be reduced as the latter move away from the feed tube or tubes for feeding the header, with a certain variation law, but preferably with the maximum variation gradient which allows housing all the junction nozzles of the solar absorption tubes it connects in the header by means of a viable manufacture, and which allows joining all those tubes to their respective nozzles by means of automatic orbital welding. The side or end areas of the header are the areas where this condition is more difficult to meet, because these are the areas having the lowest flow area and therefore they define the variation gradient.

The benefits provided by a header with a variable cross-section with respect to a header the cross-section of which is constant and of the same size as the maximum section of the variable header are set forth below:

The variable header allows improving even more the uniformity of the flow distribution in the solar absorption tubes joined thereto, it increase the speeds of the flow of salts or transfer fluid in the side areas of the header thanks to its lower cross-sectional flow areas, thus reducing the thermal strains generated against transients in the header-tubes junction nozzles and reduces in these areas the mechanical pressure stresses as a result of the mentioned reduction of the cross-sectional flow area which evidently causes less strains against the same pressure load.

Relevant advantages are derived from the these benefits, which are logically greater as the reduction of the cross-sectional flow area throughout the header is greater, which advantages include the possibility of defining thinner wall thickness and optimized for the body of the header of the present invention, enabling it to withstand the severe thermal strains experienced in the areas of the header with a low flow of salts or transfer fluid during cloud transients over the heliostat field of the solar plant in which the header is used.

Another advantage of the present invention is the capacity, allowed by its beneficial effects, to define the same concept of junction nozzle for joining the header to the solar absorption tubes for all the tubes connecting with the header, with the evident derived advantages of manufacture and cost and without needing to use other complicated designs or complex and expensive thermal protection devices for the nozzles located in the areas of the header with a low flow of salts or transfer fluid.

Another additional advantage would be the reduction of thickness which would be allowed by the present invention, on the covers for closing the header thanks to the smaller diameter thereof.

By way of example and considering in this example that only a central tube feeds the header, in a physical embodiment of the invention, the variation of the cross-section can be such that the header acquires a spindle shape. In another physical embodiment of the invention, the gradient of the variation of the section will be constant such that the header comprises two frustoconical sections joined by the larger base.

In another physical embodiment of the invention, the central area of the body of the header connecting the feed tube is maintained cylindrical to facilitate its manufacture, to immediately become variable at the outlet of this connection.

In all cases, the reduction of the cross-section throughout the header will be as much as possible, limited by a viable manufacture which allows housing in the header all the junction nozzles of the solar absorption tubes it connects and the joining thereto by welding.

By way of dimension reference, the length of the header will be approximately equal to the product of the total number of solar absorption tubes it connects multiplied by the average diameter of those tubes, taking into account the thin thickness of those tubes and that the receiver panel is formed by the arrangement of this tube parallel to one another and on a plane on which the solar rays impinge.

According to the aforementioned definition of maximum cross-section, the maximum diameter of the header will have a minimum value of the product of the average diameter of the solar absorption tubes multiplied by the square root of 1.5 times the number of solar absorption tubes; and the ratio of the minimum diameter of the header with its maximum diameter, which will be as maximum as possible, can be increased as the length of the header is greater, or in other words, as the header connects with a greater number of solar absorption tubes and, according to the ratio of diameters, the larger section increases.

In this way, the header of the present invention is more beneficial as the header has to be larger due to the need of having to connect to more solar absorption tubes, and it provides a body of the header with a thinner and more optimized thickness than previously developed headers, which better thermally matches the thin thicknesses of the solar absorption tubes it connects, causing less temperature gradients and thus less thermal strains in the header-tube junction nozzles during the cloud passage inducing severe temperature transients in the salts or transfer fluid. This significantly extends the life of the header—tubes assembly of the present invention compared to previously developed header—tubes assemblies.

This invention also eliminates the need for both the use of expensive and complex thermal protections in the nozzles located in areas of the header with low flow of salts or transfer fluid, and the need to define different nozzle designs for these areas with low flow with respect to the nozzles located in areas of the header with a higher flow, which work in more favorable conditions.

DESCRIPTION OF THE DRAWINGS

All the features that are set forth, as well as others that are characteristic of the invention, as they are included in the claims, will be better understood from the following description made with reference to the attached drawings, in which a possible embodiment given by way of a non-limiting example is shown.

In the drawings.

DESCRIPTION OF AN EMBODIMENT

Figure 1:
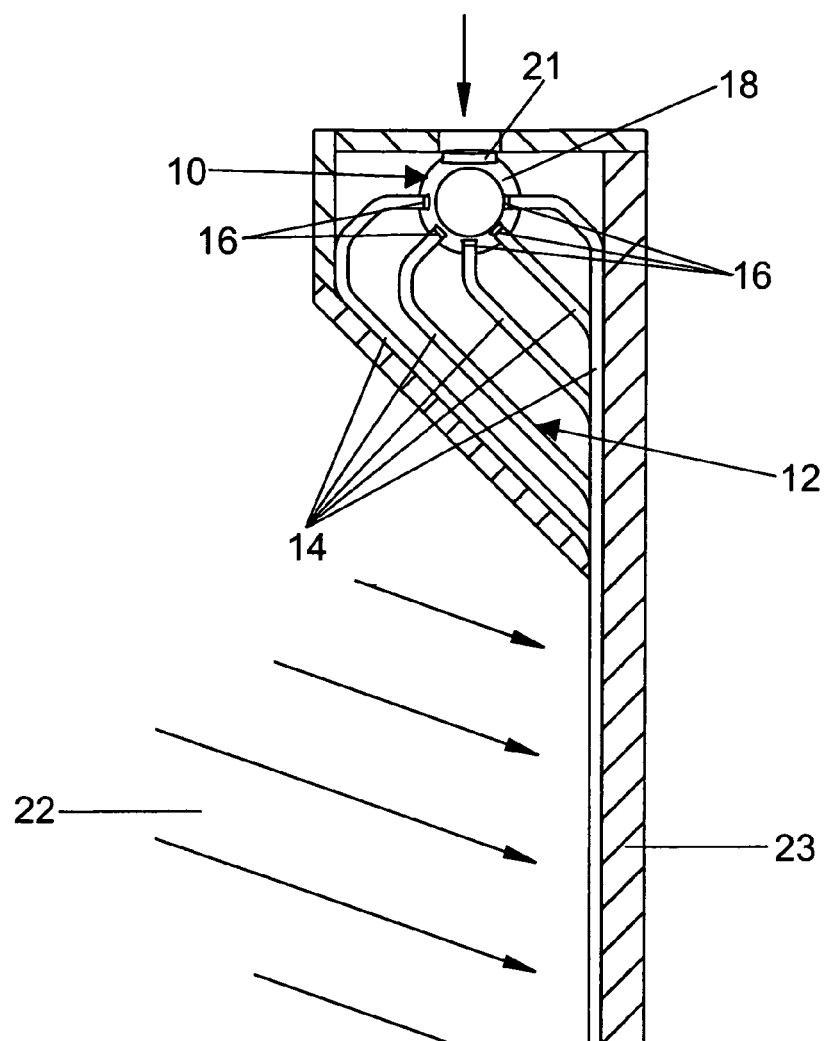
FIG. 1 shows a partially sectioned schematic side view of a solar absorption panel belonging to a central receiver, with headers formed according to the invention.

FIG. 1 shows a side view of the assembly of the header 10 according to a preferred physical embodiment of the present invention, arranged inside a solar absorption panel 12. The solar absorption panel 12 is formed by a series of solar absorption tubes 14 parallel to one another and joined by means of junction nozzles 16 for joining to the body 18 of the header 10.

The assembly of the header 10 is formed by a main body 18 with a variable cross-section and closing side covers 19 which are shown in FIGS. 2 to 6. The tubes 14 are preferably butt welded to the junction nozzles 16.

The molten salts or the transfer fluid in question enter or leave the solar absorption panel through inlet or outlet nozzles 21 joined to the header 10. The molten salts or transfer fluid absorb the heat energy of the solar radiation 22 reflected on the tubes 14 by a heliostat field (not shown).

The header assemblies are used to distribute or collect the heated salts or fluid to or from the solar absorption tubes 14. The panel assembly is insulated with thermal protections 23, to improve the thermal efficiency of the assembly, with the exception of the face of the panel on which the solar radiation 22 coming from the heliostat field impinges.

Figure 2:
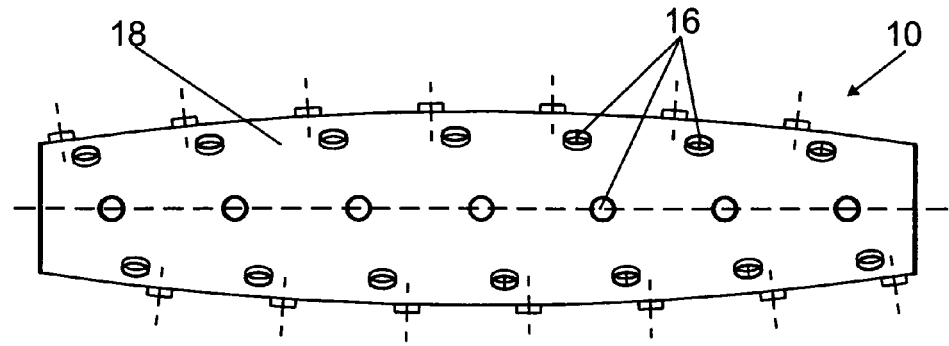
FIG. 2 shows an elevational view of a header with a variable cross-section in the shape of a spindle.
Figure 3:
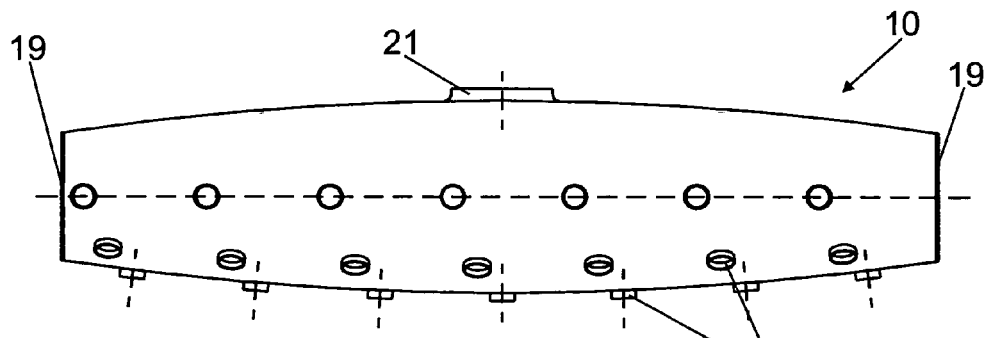
FIG. 3 shows a plan view of the header of FIG. 2.
Figure 4:
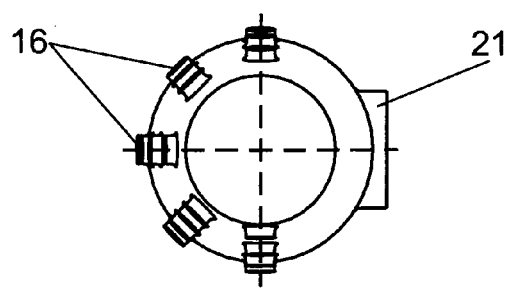
FIG. 4 shows a profile view of the header of FIG. 2.

FIGS. 2, 3 and 4 show a header 10 with a variable cross-section in the shape of a spindle according to a preferred physical embodiment of the present invention, in its elevational, plan and profile views, respectively. The nozzles, both the inlet and outlet nozzle or nozzles 21 and the junction nozzles 16 for the joining to the solar absorption tubes, will preferably be extruded directly on the body 18 of the header 10 with a variable cross-section. In the event of using welded nozzles, once the latter have been shaped or machined, they will be inserted in the previous holes which will be made in the body 18 of the header and will subsequently be welded.

The solar absorption tubes 14 will preferably be butt welded to their respective junction nozzles 16. The reliability of the header assembly will be determined to a great extent by the welds of these elements, therefore the more the process is automated, the more reliable the header 10 will be.

The reduction of the cross-section throughout the header 10 will be as maximum as possible, being limited by a viable manufacture which allows housing, in the side or end areas of the body 18 of the header 10, all the junction nozzles 16 of the solar absorption tubes 14 it connects by means of an optimized distribution and also being limited by the process of joining by welding of the assembly of the header 10 to the solar absorption tubes 14.

Figure 5:
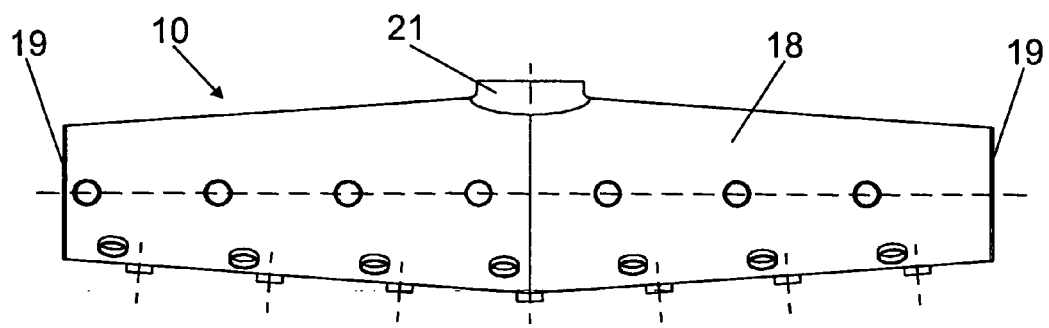
FIG. 5 shows an elevational view of a header with a variable cross-section formed by conical frustums.

FIG. 5 shows a view of a header 10 with a variable cross-section according to another physical embodiment of the present invention. In this embodiment, the gradient of the variation of the section will be constant such that the header 10 comprises two frustoconical sections sharing a larger base.

Figure 6:
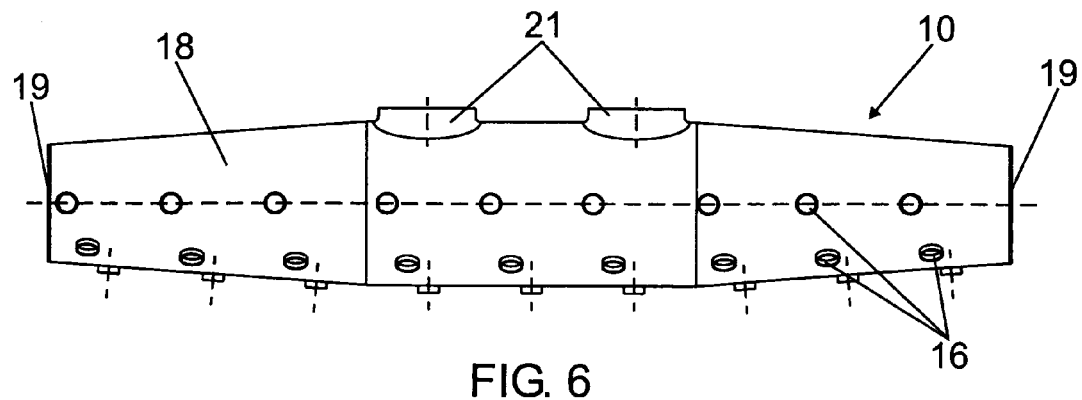
FIG. 6 shows an elevational view of a header with a variable cross-section with two inlet nozzles in which its central area with a maximum cross-section connecting with the feed tubes is a cylindrical section. Said cylindrical central area can also be applied to a header with a spindle shape.

FIG. 6 shows a view of a header 10 with a variable cross-section according to another physical embodiment of the present invention. In it, the central area of the body 18 of the header 10 connecting the feed tubes is maintained cylindrical to facilitate its manufacture, to immediately become variable at the outlet of these connections.

Despite the fact that the present invention has been set forth and explained with respect to the embodiments shown in the figures, the persons skilled in the art should understand that several changes could be made in the shape and detail of said embodiments without altering the essence and scope of the claimed invention.

The invention claimed is:

1. A thin wall header with a variable cross-section for solar absorption panels, manufactured in nickel-based superalloy for the distribution and collection of molten nitrate salts or any other fluid at high temperature, formed by a main body, a plurality of junction nozzles distributed throughout the body, connecting it to solar absorption tubes, and at least an inlet or outlet nozzle connecting the body to at least a feed tube, wherein the main body has a variable cross-section, decreasing continuously from a central area with a maximum cross-section until reaching the end sections of the body, the axis of the at least one inlet or outlet nozzle being located in said central area, and wherein the body of the header adopts a spindle shape.

2. A thin wall header with a variable cross-section for solar absorption panels, manufactured in nickel-based superalloy for the distribution and collection of molten nitrate salts or any other fluid at high temperature, formed by a main body, a plurality of junction nozzles distributed throughout the body, connecting it to solar absorption tubes, and at least an inlet or outlet nozzle connecting the body to at least a feed tube, wherein the main body has a variable cross-section, decreasing continuously from a central area with a maximum cross-section until reaching the end sections of the body, the axis of the at least one inlet or outlet nozzle being located in said central area, and wherein the central area with a maximum cross-section of the body of the header consists of a cylindrical section.

3. A thin wall header with a variable cross-section for solar absorption panels, manufactured in nickel-based superalloy for the distribution and collection of molten nitrate salts or any other fluid at high temperature, formed by a main body, a plurality of junction nozzles distributed throughout the body, connecting it to solar absorption tubes, and at least an inlet or outlet nozzle connecting the body to at least a feed tube, wherein the main body has a variable cross-section, decreasing continuously from a central area with a maximum cross-section until reaching the end sections of the body, the axis of the at least one inlet or outlet nozzle being located in said central area, wherein the sum of the flow areas of the feed tubes for feeding the header is at least equal to the flow areas of all the solar absorption tubes connecting with the header; and wherein the maximum cross-section of the body of the header is at least equal to 1.5 times the sum of the flow areas of the solar absorption tubes connected to the header.

4. A header according to claim 3, wherein the body of the header adopts a spindle shape.

5. A header according to claim 3, wherein the body of the header adopts the form of two frustoconical elements opposed by their larger base.

6. A header according to claim 3, wherein the central area with a maximum cross-section of the body of the header consists of a cylindrical section.

7. A header according to claim 3, wherein the central area with a maximum cross-section of the body of the header is defined by a plane perpendicular to the axis of said body.

* * * * *